United States Patent
Oishi

(10) Patent No.: US 9,868,491 B1
(45) Date of Patent: Jan. 16, 2018

(54) BICYCLE SPROCKET ASSEMBLY

(71) Applicant: Shimano Inc., Sakai, Osaka (JP)

(72) Inventor: Toshinari Oishi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/216,115

(22) Filed: Jul. 21, 2016

(51) Int. Cl.
*F16H 55/12* (2006.01)
*F16H 55/30* (2006.01)
*B62M 9/10* (2006.01)

(52) U.S. Cl.
CPC ..................... *B62M 9/10* (2013.01)

(58) Field of Classification Search
CPC . B62M 9/10; B62M 9/12; F16H 55/30; B60B 27/026; B60B 27/04
USPC .......................................................... 474/160
See application file for complete search history.

(56) References Cited

U.S. PATENT DOCUMENTS

| | | | | |
|---|---|---|---|---|
| 4,472,163 A * | 9/1984 | Bottini | ..................... | B62M 9/10 192/64 |
| 4,475,894 A * | 10/1984 | Sugino | ................... | B62M 9/105 474/144 |
| 4,586,914 A * | 5/1986 | Nagano | .................. | B62M 9/105 474/160 |
| 5,194,051 A * | 3/1993 | Nagano | .................... | B62M 9/10 474/160 |
| 5,503,600 A * | 4/1996 | Berecz | .................... | B62M 9/10 474/160 |
| 5,935,034 A * | 8/1999 | Campagnolo | ............ | B62M 9/10 474/160 |
| 5,954,604 A * | 9/1999 | Nakamura | ............... | B62M 9/10 474/158 |
| 6,102,821 A * | 8/2000 | Nakamura | ............... | B62M 9/10 474/160 |
| 6,176,798 B1 * | 1/2001 | Nakamura | ............... | B62M 9/10 474/160 |
| 6,382,381 B1 * | 5/2002 | Okajima | ............... | B60B 1/0215 192/64 |
| 6,428,437 B1 * | 8/2002 | Schlanger | ................ | B62M 9/10 474/160 |
| 7,044,876 B2 * | 5/2006 | Kamada | ................ | B60B 27/026 29/893 |

(Continued)

FOREIGN PATENT DOCUMENTS

JP S59-165293 U1 11/1984

*Primary Examiner* — Henry Y Liu
(74) *Attorney, Agent, or Firm* — Global IP Counselors, LLP

(57) ABSTRACT

A bicycle sprocket assembly is basically provided with a first sprocket having a first pitch circle diameter, a second sprocket having a second pitch circle diameter, a third sprocket having a third pitch circle diameter, a fourth sprocket having a fourth pitch circle diameter, and a sprocket supporting member. At least one of the second and third sprockets is attached to the sprocket supporting member. The first sprocket is attached to the second sprocket so that the second sprocket is positioned between the first sprocket and the sprocket supporting member in an axial direction. The fourth sprocket is attached to the third sprocket so that the third sprocket is positioned between the sprocket supporting member and the fourth sprocket in the axial direction. The second sprocket is adjacent to the third sprocket without another sprocket positioned therebetween in the axial direction.

19 Claims, 8 Drawing Sheets

(56) References Cited

U.S. PATENT DOCUMENTS

| | | | |
|---|---|---|---|
| 7,344,463 B2* | 3/2008 | Reiter | B62M 9/10 474/160 |
| 7,351,171 B2* | 4/2008 | Kanehisa | B60B 27/026 301/111.02 |
| 7,585,240 B2* | 9/2009 | Kamada | B62M 9/10 474/148 |
| 7,871,347 B2* | 1/2011 | Kamada | B62M 9/10 474/152 |
| 7,931,553 B2* | 4/2011 | Tokuyama | B62M 9/10 474/144 |
| 7,959,529 B2* | 6/2011 | Braedt | B62M 9/10 474/152 |
| 8,057,338 B2* | 11/2011 | Kamada | B62M 9/10 474/152 |
| 8,197,371 B2* | 6/2012 | D'Aluisio | B62M 9/12 301/110.5 |
| 8,454,461 B2* | 6/2013 | Valle | B62M 9/10 474/152 |
| 8,696,503 B2* | 4/2014 | Oishi | B62M 9/10 474/160 |
| 8,764,594 B2* | 7/2014 | Dal Pra' | B62M 9/10 474/160 |
| 8,821,330 B2* | 9/2014 | Dal Pra' | B62M 9/10 474/160 |
| 8,905,878 B2* | 12/2014 | Loy | B62M 9/10 474/160 |
| 8,911,314 B2* | 12/2014 | Braedt | B62M 9/10 474/160 |
| 8,968,130 B2* | 3/2015 | Liao | B62M 9/10 474/160 |
| 9,193,416 B2* | 11/2015 | Tokuyama | B62M 9/10 |
| 9,308,967 B2* | 4/2016 | Braedt | B62M 9/10 |
| 9,415,835 B2* | 8/2016 | Tokuyama | B62M 9/12 |
| 2001/0039224 A1* | 11/2001 | Lim | B62M 9/10 474/160 |
| 2003/0064844 A1* | 4/2003 | Lin | B62M 9/10 474/160 |
| 2004/0121867 A1* | 6/2004 | Reiter | B62M 9/10 474/160 |
| 2004/0142782 A1* | 7/2004 | Kamada | B60B 27/026 474/160 |
| 2004/0142783 A1* | 7/2004 | Kamada | B60B 27/026 474/160 |
| 2005/0009654 A1* | 1/2005 | Kanehisa | B60B 27/04 474/152 |
| 2006/0172840 A1* | 8/2006 | Kamada | B62M 9/10 474/152 |
| 2006/0258499 A1* | 11/2006 | Kamada | B62M 9/10 474/160 |
| 2007/0054770 A1* | 3/2007 | Valle | B62M 9/10 474/160 |
| 2008/0004143 A1* | 1/2008 | Kanehisa | B62M 9/10 474/160 |
| 2008/0188336 A1* | 8/2008 | Tokuyama | B62M 9/10 474/160 |
| 2009/0042679 A1* | 2/2009 | Valle | B62M 9/10 474/152 |
| 2009/0042680 A1* | 2/2009 | Valle | B62M 9/10 474/160 |
| 2009/0042681 A1* | 2/2009 | Dal Pra' | B62M 9/10 474/160 |
| 2009/0042682 A1* | 2/2009 | Dal Pra' | F16H 55/30 474/160 |
| 2009/0098966 A1* | 4/2009 | Kamada | B62M 9/10 474/160 |
| 2010/0009794 A1* | 1/2010 | Chiang | B62M 9/10 474/160 |
| 2010/0075791 A1* | 3/2010 | Braedt | B62M 9/10 474/160 |
| 2010/0099530 A1* | 4/2010 | Chiang | B62M 9/10 474/160 |
| 2011/0092327 A1* | 4/2011 | Oishi | B62M 9/10 474/160 |
| 2011/0105263 A1* | 5/2011 | Braedt | F16H 55/303 474/160 |
| 2012/0196711 A1* | 8/2012 | Loy | B62M 9/10 474/160 |
| 2012/0208662 A1* | 8/2012 | Braedt | B62M 9/10 474/160 |
| 2012/0220402 A1* | 8/2012 | D'Aluisio | B62M 9/12 474/160 |
| 2012/0225745 A1* | 9/2012 | Oishi | B62M 9/10 474/160 |
| 2012/0244976 A1* | 9/2012 | Lin | B62M 9/10 474/160 |
| 2012/0244977 A1* | 9/2012 | Liao | B62M 9/10 474/160 |
| 2012/0244978 A1* | 9/2012 | Liao | B62M 9/10 474/160 |
| 2012/0277045 A1* | 11/2012 | Valle | B62M 9/10 474/156 |
| 2012/0309572 A1* | 12/2012 | Braedt | B62M 9/10 474/160 |
| 2012/0322598 A1* | 12/2012 | Lin | B62M 9/10 474/160 |
| 2013/0017914 A1* | 1/2013 | Braedt | B62M 9/10 474/160 |
| 2013/0049448 A1* | 2/2013 | Kitamura | B60B 27/0068 301/110.5 |
| 2014/0179474 A1* | 6/2014 | Florczyk | B62M 9/10 474/160 |
| 2014/0302956 A1* | 10/2014 | Dal Pr | B62M 9/10 474/160 |
| 2015/0018151 A1* | 1/2015 | Dal Pr | F16H 55/30 474/160 |
| 2015/0080160 A1* | 3/2015 | Staples | B62M 9/12 474/160 |
| 2015/0133249 A1* | 5/2015 | Tsai | B62M 9/12 474/160 |
| 2015/0210353 A1* | 7/2015 | Tokuyama | B62M 9/12 474/160 |
| 2015/0285358 A1* | 10/2015 | Numata | F16H 55/08 474/160 |
| 2016/0059932 A1* | 3/2016 | Braedt | B62M 9/10 474/160 |
| 2016/0083045 A1* | 3/2016 | Lin | F16H 55/30 474/160 |
| 2016/0114859 A1* | 4/2016 | Tsai | F16H 55/30 474/160 |
| 2016/0144929 A1* | 5/2016 | Staples | B62M 9/12 474/160 |

\* cited by examiner

BICYCLE SPROCKET ASSEMBLY

BACKGROUND

Field of the Invention

This invention generally relates to a bicycle sprocket assembly. More specifically, the present invention relates to a bicycle sprocket assembly including four sprockets attached to a sprocket supporting member.

Background Information

Most bicycles utilize a chain drive transmission in which a chain is moved between a plurality of front sprockets and a plurality of rear sprockets to change gears. In recent years, bicycle component manufacturers have been manufacturing bicycle transmissions that have more available speeds to the rider. As the available speeds in the bicycle transmission increases, the number of sprockets installed on the rear wheel also usually increases. Accordingly, various attempts have been made in order to increase the maximum number of sprockets that can be installed on a rear hub assembly. For example, some multiple sprocket assemblies use a spider (sprocket supporting member), which supports a plurality of ring-shaped sprocket wheels on a freewheel of a rear hub. In order to reduce an overall weight of the multiple sprocket assembly that uses a spider, a light metal, such as aluminum, etc., is generally used for the spider, while various types of steel materials are used for the sprockets to provide adequate strength. One example of a. multiple sprocket assembly that uses a spider is disclosed in U.S. Pat. No. 6,382,381 (assigned to Shimano Inc.).

SUMMARY

Generally, the present disclosure is directed to various features of a bicycle sprocket assembly.

In view of the state of the known technology and in accordance with a first aspect of the present disclosure, a bicycle sprocket assembly is basically provided that includes a first sprocket having a first pitch circle with a first diameter, a second sprocket having a second pitch circle with a second diameter that is smaller than the first diameter, a third sprocket having a third pitch circle with a third diameter that is smaller than the second diameter, a fourth sprocket having a fourth pitch circle with a fourth diameter that is smaller than the third diameter, and a sprocket supporting member having a hub engagement portion. At least one of the second sprocket and the third sprocket is attached to the sprocket supporting member. The first sprocket is attached to the second sprocket by at least one first fastener so that the second sprocket is positioned between the first sprocket and the sprocket supporting member in an axial direction parallel to a rotational center axis of the bicycle sprocket assembly. The fourth sprocket is attached to the third sprocket by at least one second fastener so that the third sprocket is positioned between the sprocket supporting member and the fourth sprocket in the axial direction. The second sprocket is adjacent to the third sprocket without another sprocket positioned between the second sprocket and the third sprocket in the axial direction. According to the first aspect of the present invention, the bicycle sprocket assembly is configured such that the weight of the bicycle sprocket assembly is reduced.

In accordance with a second aspect of the present invention, a bicycle sprocket assembly according to the first aspect is configured so that the sprocket supporting member has a first axially facing surface and a second axially facing surface non-facing with respect to the first axially facing surface in the axial direction. According to the second aspect of the present invention, the sprocket supporting member is effectively positioned to provide a compact bicycle sprocket assembly.

In accordance with a third aspect of the present invention, the bicycle sprocket assembly according to the second aspect is configured so that the second sprocket is attached to the first axially facing surface of the sprocket supporting member. According to the third aspect of the present invention, the second sprocket is effectively positioned to provide a compact bicycle sprocket assembly.

In accordance with a fourth aspect of the present invention, the bicycle sprocket assembly according to the second or third aspect is configured so that the third sprocket is attached to the second axially facing surface of the sprocket supporting member. According to the fourth aspect of the present invention, the third sprocket is effectively positioned to provide a compact bicycle sprocket assembly.

In accordance with a fifth aspect of the present invention, the bicycle sprocket assembly according to any one the first to fourth aspects is configured so that the second sprocket and the third sprocket are attached to the sprocket supporting member by at least one third fastener. According to the fifth aspect of the present invention, the second and third sprockets are effectively positioned to provide a compact bicycle sprocket assembly.

In accordance with a sixth aspect of the present invention, the bicycle sprocket assembly according to any one of the first to fifth aspects is configured so that the first sprocket is adjacent to the second sprocket without another sprocket positioned between the first sprocket and the second sprocket in the axial direction. According to the sixth aspect of the present invention, the first and second sprockets are effectively positioned to provide a compact bicycle sprocket assembly.

In accordance with a seventh aspect of the present invention, the bicycle sprocket assembly according to any one of the first to sixth aspects is configured so that the third sprocket is adjacent to the fourth sprocket without another sprocket positioned between the third sprocket and the fourth sprocket in the axial direction. According to the seventh aspect of the present invention, the third and fourth sprockets are effectively positioned to provide a compact bicycle sprocket assembly.

In accordance with an eighth aspect of the present invention, the bicycle sprocket assembly according to the fifth aspect is configured so that the at least one third fastener is positioned radially outwardly from the hub engagement portion of the sprocket supporting member with respect to the rotational center axis. According to the eighth aspect of the present invention, the at least one third fastener is effectively positioned to provide a compact bicycle sprocket assembly.

In accordance with a ninth aspect of the present invention, the bicycle sprocket assembly according to the eighth aspect is configured so that the at least one first fastener is positioned radially outwardly from the at least one third fastener with respect to the rotational center axis. According to the ninth aspect of the present invention, the at least one first fastener and the at least one third fastener are effectively positioned to provide a compact bicycle sprocket assembly.

In accordance with a tenth aspect of the present invention, the bicycle sprocket assembly according to the eighth or ninth aspect is configured so that the at least one second fastener is positioned radially outwardly from the at least one third fastener with respect to the rotational center axis. According to the tenth aspect of the present invention, the at least one second fastener and the at least one third fastener are effectively positioned to provide a compact bicycle sprocket assembly.

In accordance with an eleventh aspect of the present invention, the bicycle sprocket assembly according to any one of the first to eighth aspects is configured so that the at least one first fastener is positioned radially outwardly from the at least one second fastener with respect to the rotational center axis. According to the eleventh aspect of the present invention, the at least one first fastener and the at least one second fastener are effectively positioned to provide a compact bicycle sprocket assembly.

In accordance with a twelfth aspect of the present invention, the bicycle sprocket assembly according to any one of the first to eleventh aspects is configured so that a fifth sprocket has a fifth pitch circle with a fifth diameter that is smaller than the fourth diameter. A sixth sprocket has a sixth pitch circle with a sixth diameter that is smaller than the fifth diameter. A seventh sprocket has a seventh pitch circle with a seventh diameter that is smaller than the sixth diameter. An eighth sprocket has an eighth pitch circle with an eighth diameter that is smaller than the seventh diameter. An additional sprocket supporting member has an additional hub engagement portion. At least one of the sixth sprocket and the seventh sprocket is attached to the additional sprocket supporting member. The fifth sprocket is attached to the sixth sprocket by at least one fourth fastener so that the sixth sprocket is positioned between the fifth sprocket and the additional sprocket supporting member in the axial direction. The eighth sprocket is attached to the seventh sprocket by at least one fifth fastener so that the seventh sprocket is positioned between the additional sprocket supporting member and the eighth sprocket in the axial direction. The sixth sprocket is adjacent to the seventh sprocket without another sprocket positioned between the sixth sprocket and the seventh sprocket in the axial direction. In accordance with the twelfth aspect of the present invention, the number of sprocket supporting members is reduced to reduce the weight of the bicycle sprocket assembly.

In accordance with a thirteenth aspect of the present invention, the bicycle sprocket assembly according to the twelfth aspect is configured so that a spacer is positioned between the sprocket supporting member and the additional sprocket supporting member in the axial direction. In accordance with the thirteenth aspect of the present invention, the spacer is effectively positioned to provide a compact bicycle sprocket assembly.

In accordance with a fourteenth aspect of the present invention, the bicycle sprocket assembly according to the twelfth or thirteenth aspect is configured so that the spacer is positioned radially inwardly from the at least one fifth fastener with respect to the rotational center axis. According to the fourteenth aspect of the present invention, the spacer and the at least one third fastener are effectively positioned to provide a compact bicycle sprocket assembly.

In accordance with a fifteenth aspect of the present invention, the bicycle sprocket assembly according to any one of the twelfth to fourteenth aspects is configured so that the sixth sprocket and the seventh sprocket are attached to the additional sprocket supporting member by at least one sixth fastener. According to the fifteenth aspect of the present invention, the sixth and seven sprockets are effectively positioned to provide a compact bicycle sprocket assembly.

In accordance with a sixteenth aspect of the present invention, the bicycle sprocket assembly according to the thirteenth or fourteenth aspect is configured so that the sixth sprocket and the seventh sprocket are attached to the additional sprocket supporting member by at least one sixth fastener. According to the sixteenth aspect of the present invention, the spacer and the at least one sixth fastener are effectively positioned to provide a compact bicycle sprocket assembly.

In accordance with a seventeenth aspect of the present invention, the bicycle sprocket assembly according to the fifteenth aspect is configured so that the second sprocket and the third sprocket are attached to the sprocket supporting member by at least one third fastener. The at least one sixth fastener is positioned radially inwardly from the at least one third fastener with respect to the rotational center axis. According to the seventeenth aspect of the present invention, the second sprocket, the third sprocket, the at least one third fastener and the at least one sixth fastener are effectively positioned to provide a compact bicycle sprocket assembly.

In accordance with an eighteenth aspect of the present invention, the bicycle sprocket assembly according to any one of the twelfth to seventeenth aspects is configured so that the additional sprocket supporting member has a third axially facing surface and a fourth axially facing surface non-facing with respect to the third axially facing surface in an axial direction parallel to a rotational center axis of the bicycle sprocket assembly. According to the eighteenth aspect of the present invention, the additional sprocket supporting member is effectively positioned to provide a compact bicycle sprocket assembly.

In accordance with a nineteenth aspect of the present invention, the multiple bicycle sprocket assembly according to the eighteenth aspect is configured so that the sixth sprocket is attached to the third axially facing surface of the additional sprocket supporting member. According to the nineteenth aspect of the present invention, the sixth sprocket is effectively positioned to provide a compact bicycle sprocket assembly.

In accordance with a twentieth aspect of the present invention, the multiple bicycle sprocket assembly according to the eighteenth aspect is configured so that the seventh sprocket is attached to the fourth axially facing surface of the additional sprocket supporting member. According to the twentieth aspect of the present invention, the seventh sprocket is effectively positioned to provide a compact bicycle sprocket assembly.

Also other objects, features, aspects and advantages of the disclosed multiple bicycle sprocket assembly will become apparent to those skilled in the art from the following detailed description, which, taken in conjunction with the annexed drawings, discloses exemplary embodiments of the bicycle sprocket assembly.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the bicycle field from this disclosure that the following descriptions of the exemplary embodiments are provided for illustration only and not for the purpose of limiting the invention as defined by the appended claims and their equivalents.

Because the various parts of a bicycle are well known in the bicycle art, these parts of the bicycle will not be discussed or illustrated in detail herein, except as they are modified in accordance with the exemplary embodiments of the present invention. It will be apparent to those skilled in the bicycle field from this disclosure that a multiple bicycle sprocket assembly 1 in accordance with the present invention can have fewer or more sprockets.

Figure 1:
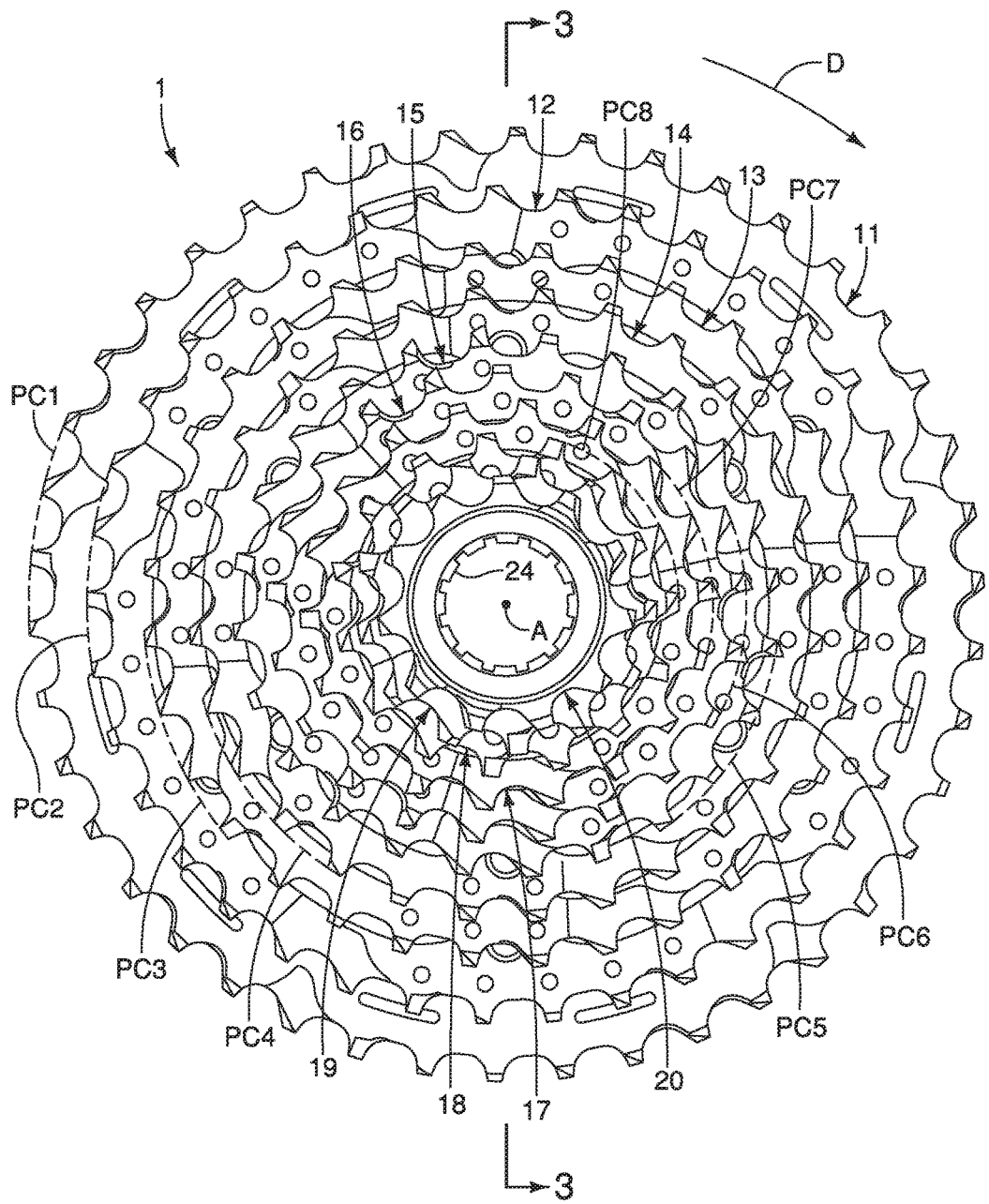
FIG. 1 is an outbound side elevational view of a multiple (ten-stage) bicycle sprocket assembly in accordance with one illustrated embodiment.
Figure 2:
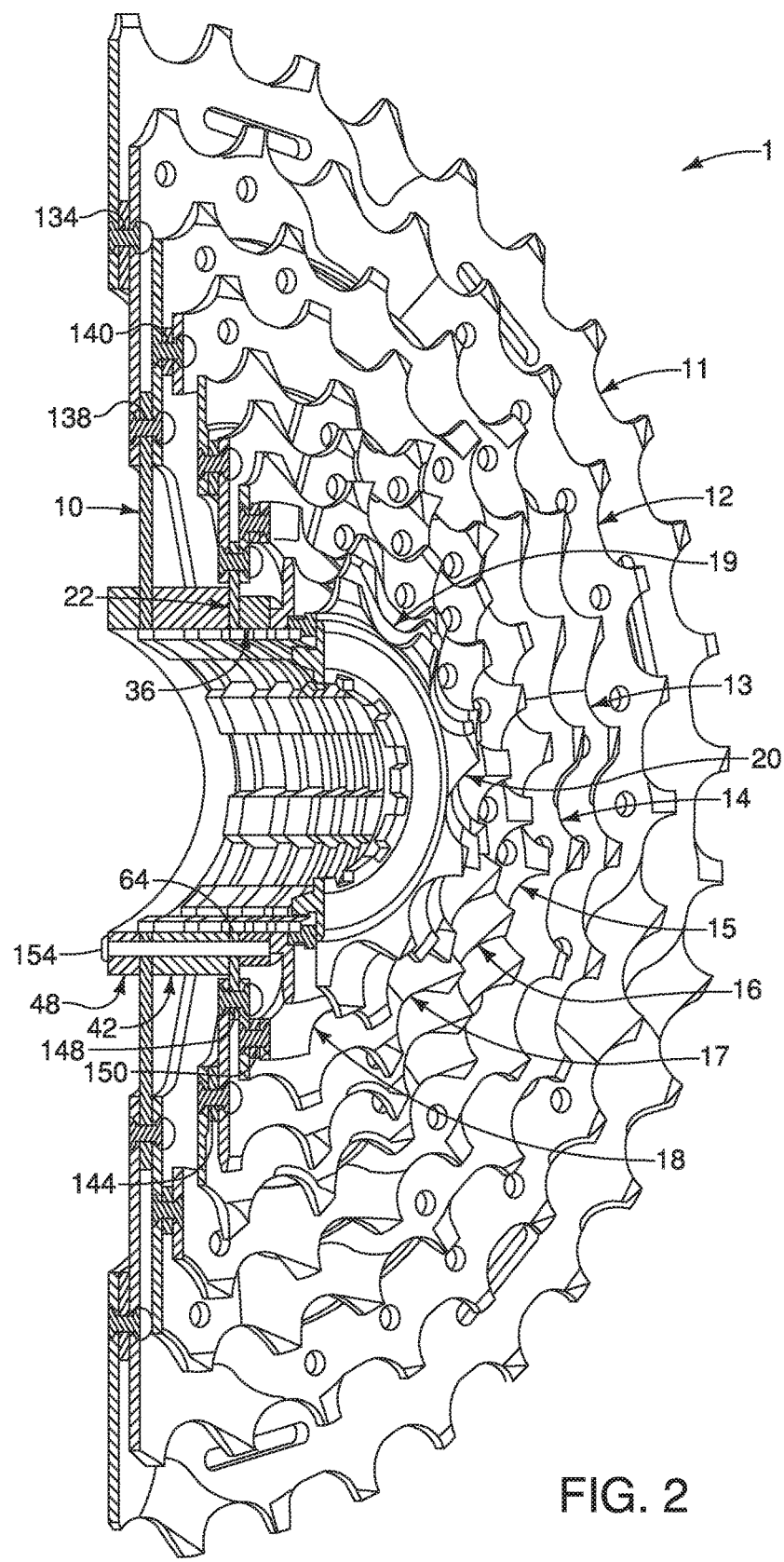
FIG. 2 is a perspective view of the multiple bicycle sprocket assembly of FIG. 1 with a portion broken away.
Figure 3:
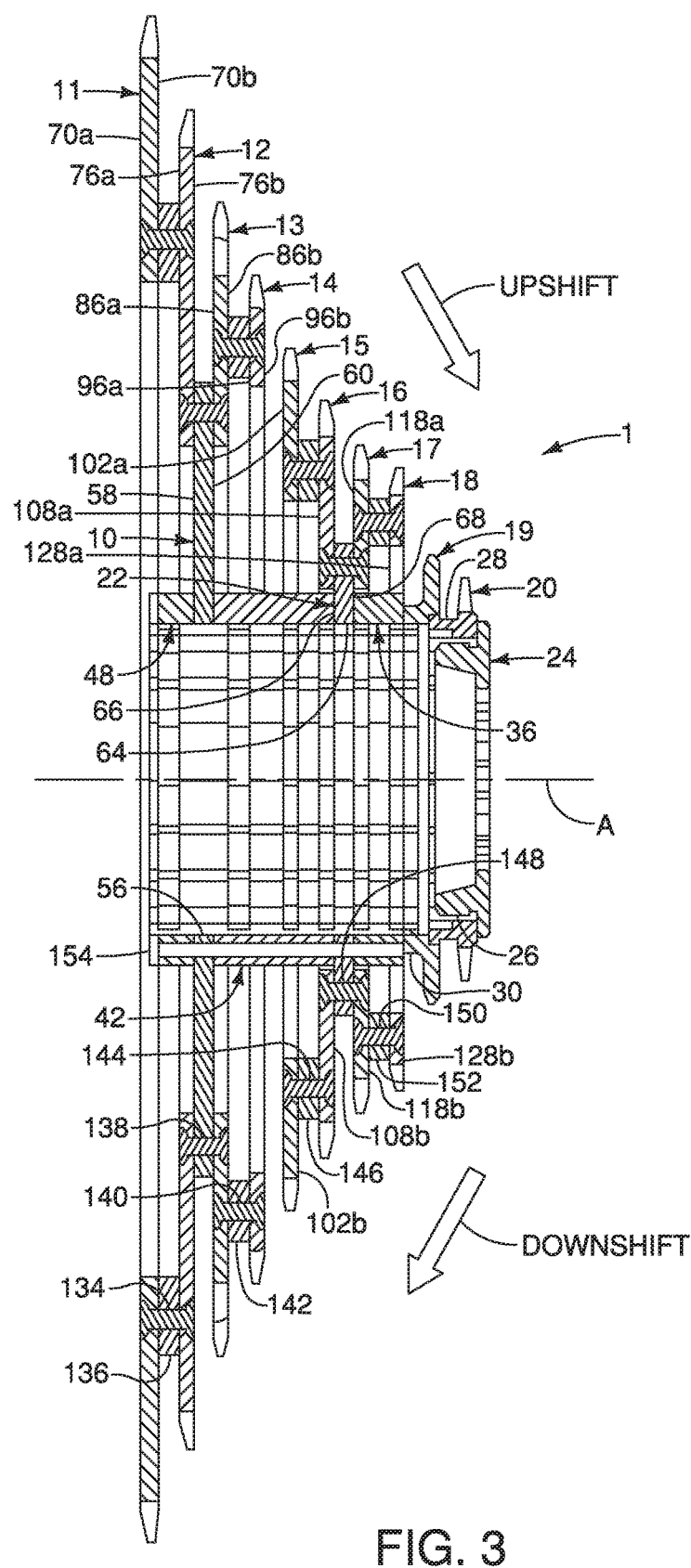
FIG. 3 is a cross sectional view of the multiple bicycle sprocket assembly as seen along section line 3-3 of FIG. 1.

Referring initially to FIGS. 1 to 3, a multiple bicycle sprocket assembly 1 is illustrated in accordance with a first exemplary embodiment of the present invention. In the illustrated exemplary embodiment, the multiple bicycle sprocket assembly 1 includes at least a sprocket supporting member, such as a first sprocket supporting member 10, and at least four sprockets, such as first to fourth sprockets 11-14. As shown in this exemplary embodiment, a second sprocket 12 is disposed adjacent the first sprocket 11, a third sprocket 13 is disposed adjacent the second sprocket 12 on an opposite side from the first sprocket 11, and a fourth sprocket 14 is disposed adjacent the third sprocket 13 on an opposite side from the second sprocket 12.

As shown in FIGS. 1 to 3, the sprocket assembly 1 includes ten sprockets 11-20. The second through tenth sprockets 12-20 are disposed in a bicycle outbound direction of the first sprocket 11. The sprockets 11-20 are axially spaced from each other at predetermined intervals. The sprockets 15-18 are configured to be attached to a second sprocket supporting member (i.e., another sprocket supporting member) 22 of the bicycle sprocket assembly 1 in a similar manner as sprockets 11-14 are attached to the first sprocket supporting member 10. The sprockets 19 and 20 are configured to be fixedly mounted on a freewheel (not shown) of a rear hub (not shown). The sprockets 11-20 are configured to rotate together about a rotational center axis A. The sprockets 11-20 typically rotate together in a forward rotational direction D (e.g., in a clockwise direction as viewed in FIG. 1) when the rider is pedaling in a forward (clockwise) direction to propel the bicycle in a forward direction.

As shown in FIGS. 1 to 3, the sprockets 11 to 20 are hard, rigid disc shaped members formed from a suitable material, such as a metallic material. In the illustrated exemplary embodiment, the sprockets 11 to 20 are each a one-piece, unitary member formed of a metallic material that is suitable for a bicycle sprocket. Referring to FIG. 3, the sprocket assembly 1 is illustrated in partial cross-section with arrows showing the directions of an upshift operation and a downshift operation. An upshift operation occurs when the chain is moved from a large sprocket to the next smaller sprocket, while a downshift operation occurs when the chain is shifted from a small sprocket to the next larger sprocket. The sprockets 11 to 20 are designed so that the chain can execute smooth downshifting and upshifting motions. The sprockets 11-20 can include modified teeth, such as teeth having inclined surfaces and/or recesses, to facilitate the downshifting and upshifting operations.

As shown in FIGS. 1 to 3, the sprockets 11-20 are secured on the freewheel of the rear hub with a lock ring 24. An outer peripheral surface 26 of the lock ring 24 is preferably threaded, as shown in FIG. 4, to engage a threaded surface of the freewheel (not shown), thereby securing the sprocket assembly 1 to the rear hub.

Figure 4:
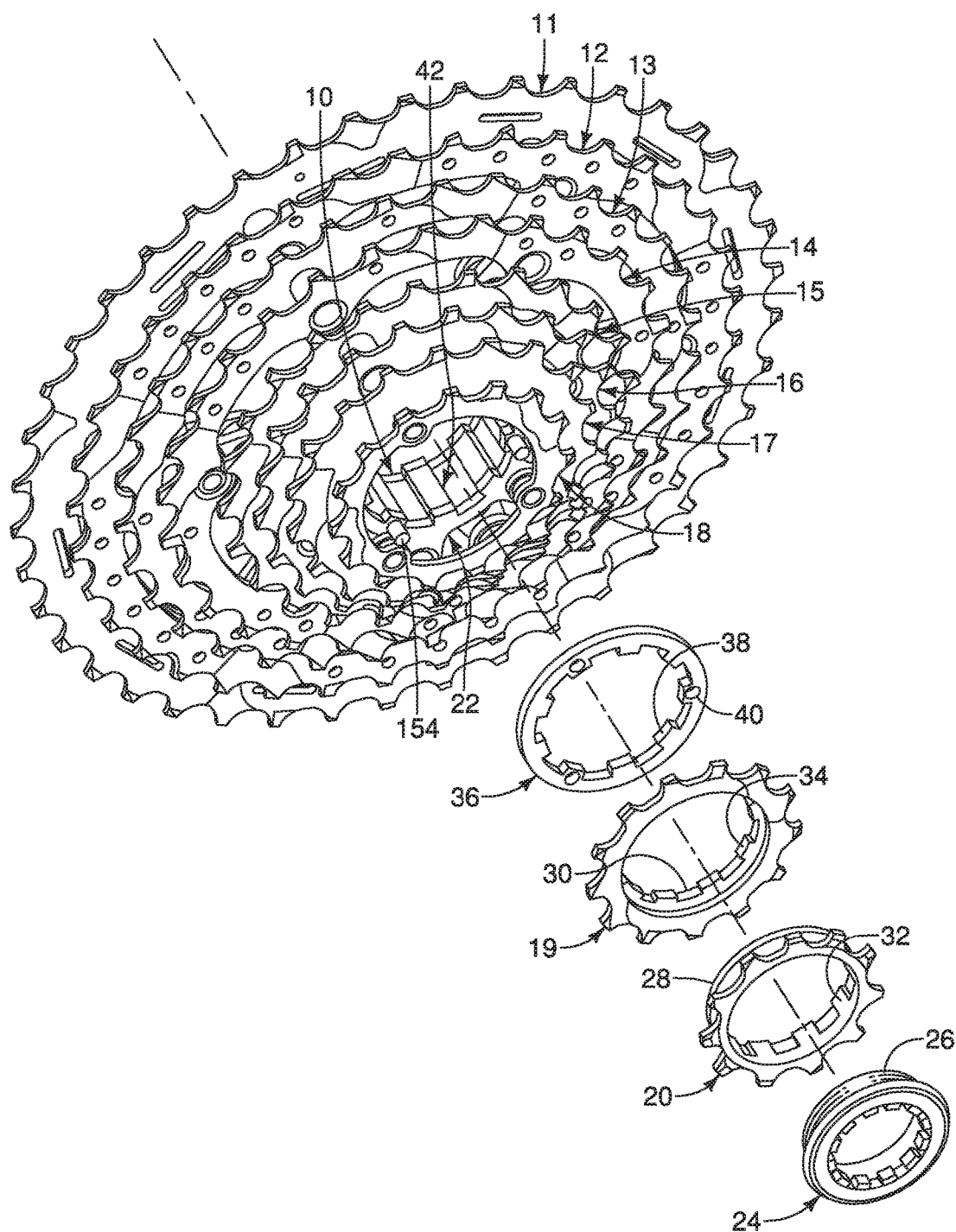
FIG. 4 is a partial exploded perspective view of the multiple bicycle sprocket assembly illustrated in FIGS. 1 to 3.

The sprocket 20 includes an integral axial spacing portion 28, as shown in FIGS. 3 and 4, to maintain axial space between the sprocket 20 and the sprocket 19. The sprocket 19 includes an integral axial spacing portion 30 to maintain axial space between the sprocket 19 and the second sprocket supporting member 22. Each of the sprockets 19 and 20 has a sprocket-hub engagement portion 32 and 34 configured to be directly fixedly mounted on the freewheel of the rear hub, as shown in FIGS. 2 to 4, thereby non-rotatably engaging each of the sprockets 19 and 20 with the freewheel.

Figure 6:
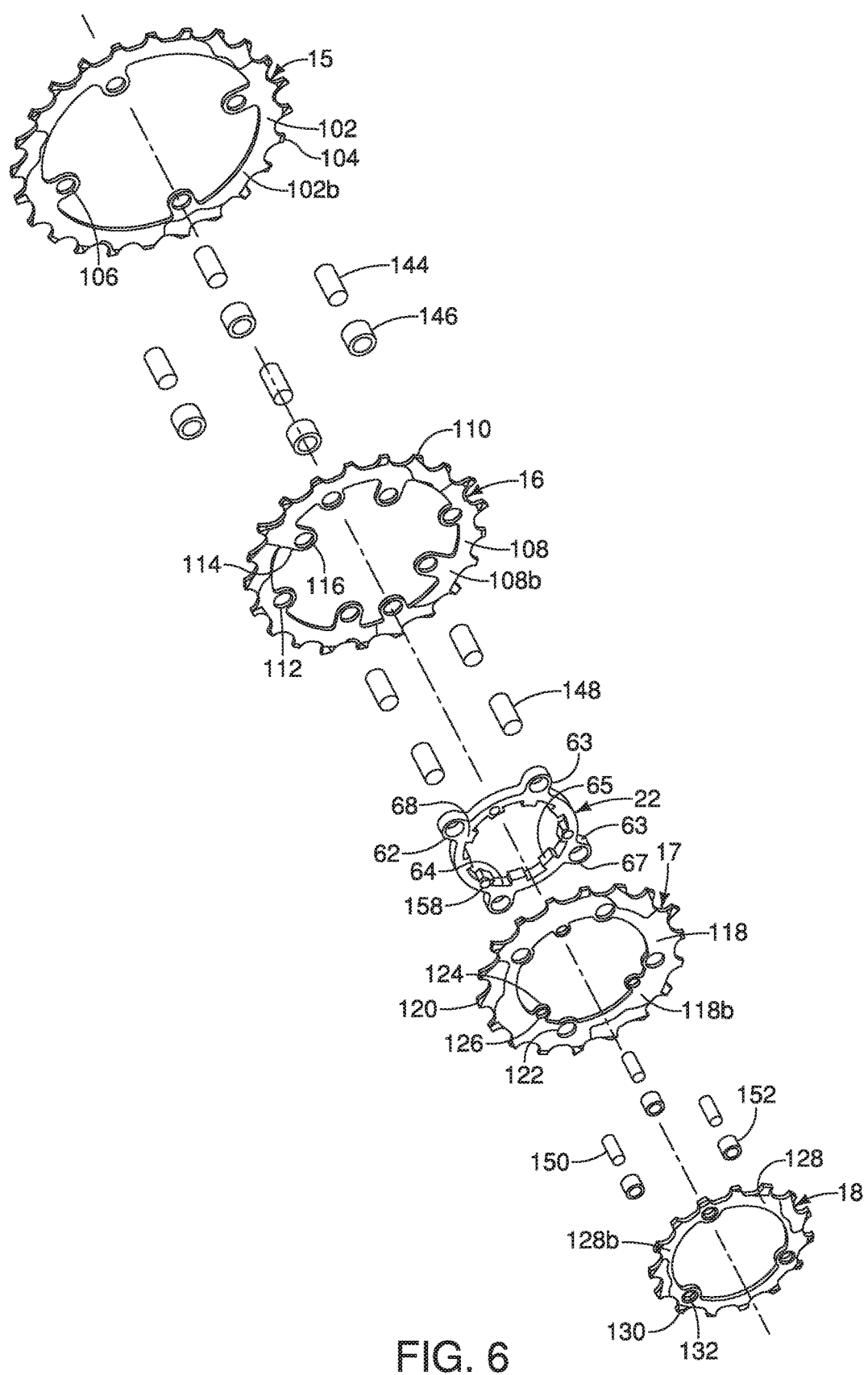
FIG. 6 is a partial exploded perspective view of selected sprockets of the multiple bicycle sprocket assembly illustrated in FIGS. 1 to 4.

A spacer 36, as shown in FIGS. 3, 4 and 6, is disposed on the freewheel of the rear hub. The spacer 36 is provided between the sprocket 19 and the second sprocket supporting member 22 to maintain axial space between the sprockets 19 and 18. The spacer 36 includes a hub engagement portion 38 configured to be directly fixedly mounted on the freewheel, thereby non-rotatably engaging the spacer 36 with the freewheel of the rear hub. The spacer 36 includes at least one fastener opening 40.

Figure 5:
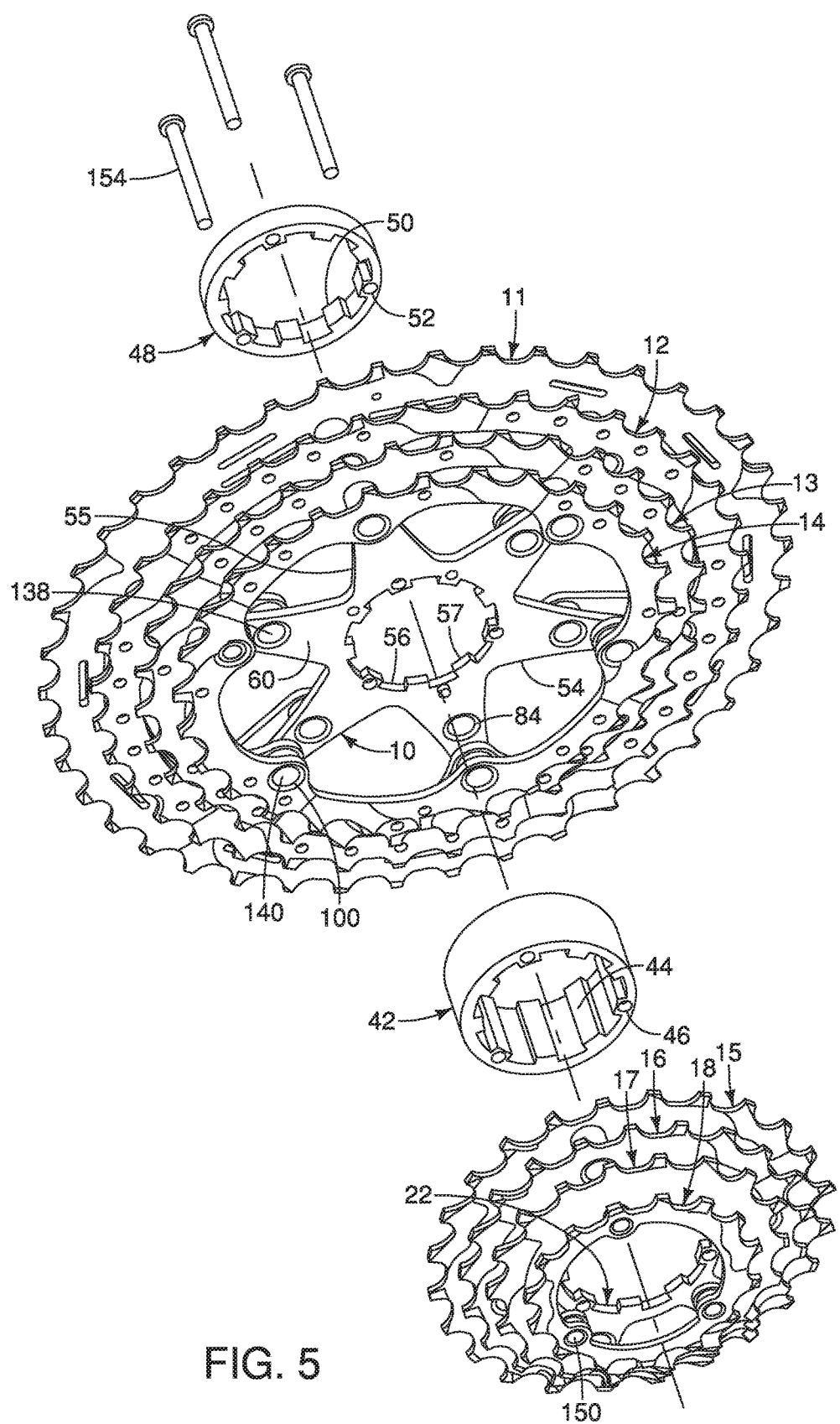
FIG. 5 is a partial exploded perspective view of selected sprockets of the multiple bicycle sprocket assembly illustrated in FIGS. 1 to 4.

A spacer 42, as shown in FIGS. 3 and 5, is disposed on the freewheel of the rear hub. The spacer 42 is provided between the first sprocket supporting member 10 and the second sprocket supporting member (the additional sprocket supporting member) 22 in the axial direction to maintain axial space between the sprockets 15 and 14. The spacer 42 includes a hub engagement portion 44 configured to be directly fixedly mounted on the freewheel of the rear hub, thereby non-rotatably engaging the spacer 42 with the freewheel of the rear hub. The spacer 42 includes at least one fastener opening 46.

A spacer 48, as shown in FIGS. 3 and 5, is disposed on the freewheel of the rear hub, The spacer 48 is provided between the first sprocket supporting member 10 and a bicycle inboard end of the freewheel to maintain axial space between the first sprocket 11 and the bicycle inboard end of the freewheel. The spacer 48 includes a hub engagement portion 50 configured to be directly fixedly mounted on the freewheel of the rear hub, thereby non-rotatably engaging the spacer 48 on the freewheel of the rear hub. The spacer 48 includes at least one fastener opening 52.

Figure 7:
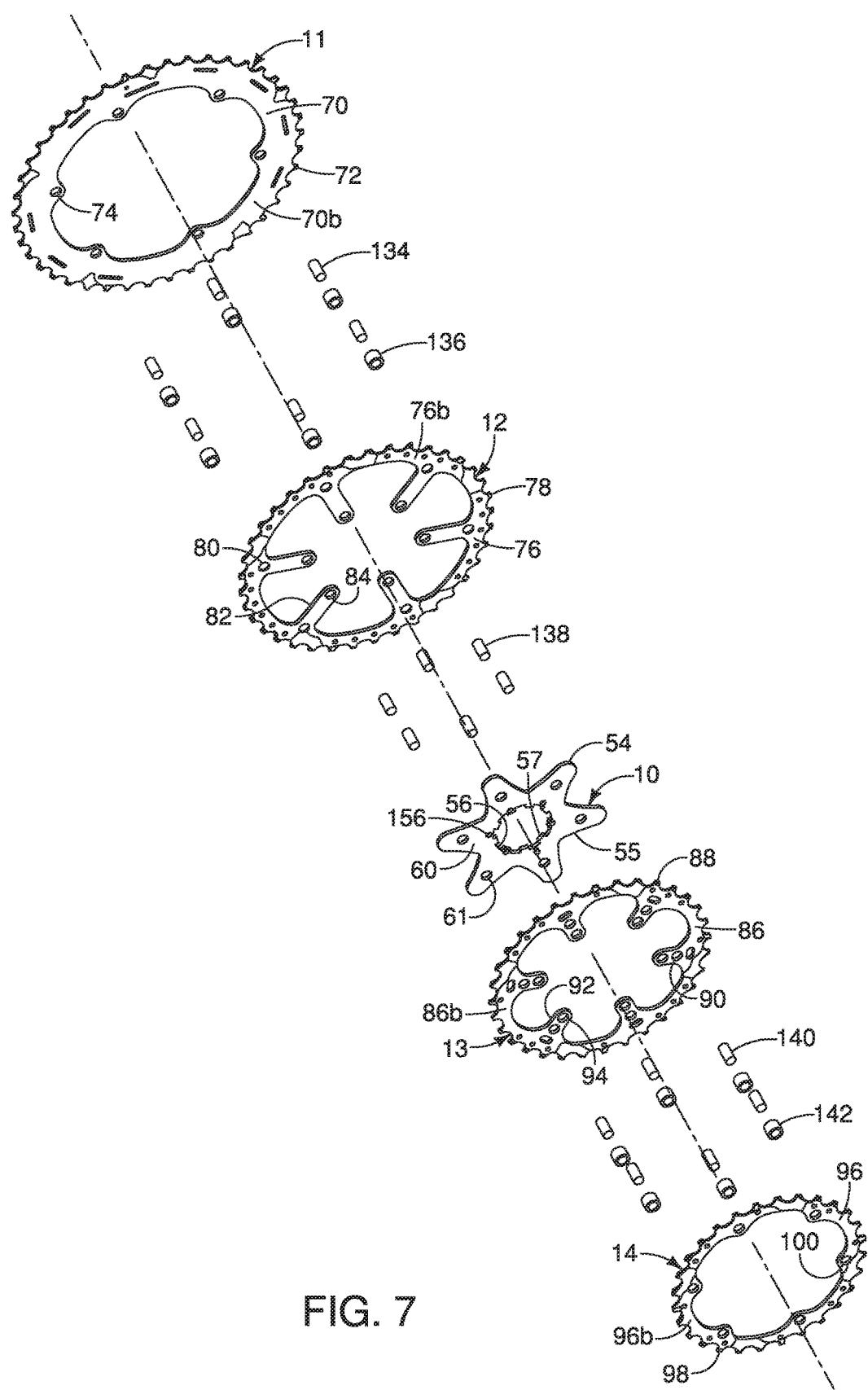
FIG. 7 is a partial exploded perspective view of selected sprockets of the multiple bicycle sprocket assembly illustrated in FIGS. 1 to 4.

The first sprocket supporting member 10 includes a first sprocket mounting portion 54 and a hub engagement portion 56, as shown in FIGS. 3 and 7. The first sprocket mounting portion 54 includes a plurality of arms 55 radially extending from the sprocket hub engagement portion 56. As shown in FIG. 7, the first sprocket mounting portion 54 includes six arms 55, although any suitable number can be used. The first sprocket mounting portion 54 of the first sprocket supporting member 10 has a first bicycle inbound facing side (i.e., a first axially facing surface) 58 and a first bicycle outbound facing side (i.e., a second axially facing surface) 60 non-facing, with respect to the first bicycle inbound facing side 58 in an axial direction parallel to the rotational center axis A of the multiple bicycle sprocket assembly 1. The first axially facing surface 58 and the second axially facing surface 60 face in opposite directions. A plurality of fastener openings 61 are disposed in the first sprocket mounting portion 54. The fastener openings 61 extend from the bicycle inbound facing side 58 to the bicycle outbound facing side 60. At least one of the second sprocket 12 and the third sprocket 13 is attached to the first sprocket supporting member. As shown in FIGS. 2 and 3, the second and third sprockets 12 and 13 are coupled to the first sprocket mounting portion 54. The second sprocket 12 is attached to the bicycle inbound facing side (first axially facing surface) 58 and the third sprocket 13 is attached to the bicycle outbound facing side (second axially facing surface) 60. At least one spline 57 extends from the sprocket hub engagement portion 56. Preferably, a plurality of splines 57 are circumferentially disposed about the sprocket hub engagement portion 56. The at least one spline 57 of the sprocket hub engagement portion 56 non-rotatably engages the freewheel of the rear hub such that the first sprocket supporting member 10 rotates with the freewheel of the rear hub.

The second sprocket supporting member (i.e., an additional sprocket member) 22 includes a second sprocket mounting portion 62 and a second hub engagement portion (i.e., an additional hub engagement portion) 64, as shown in FIGS. 3 and 6. The second sprocket mounting portion 62 includes a plurality of arms 63 radially extending from the sprocket hub engagement portion 64. As shown in FIG. 6, the first sprocket mounting portion 62 includes four arms 63, although any suitable number can be used, The second sprocket mounting portion 62 of the second sprocket supporting member (the additional sprocket member) has a second bicycle inbound facing side (i.e., a third axially facing surface) 66 and a second bicycle outbound facing side (i.e., a fourth axially facing surface) 68 non-facing with respect to the second bicycle inbound facing side 66 in an axial direction parallel to the rotational center axis A of the multiple bicycle sprocket assembly 1. The third axially facing surface 66 and the fourth axially facing surface 68 face in opposite directions. A plurality of fastener openings 67 are disposed in the second sprocket mounting portion 62. The fastener openings 67 extend from the second bicycle inbound facing side 66 to the second bicycle outbound facing side 68. At least one of the sixth sprocket 16 and the seventh sprocket 17 is attached to the second sprocket supporting member (the additional sprocket supporting member) 22. The sixth and seventh sprockets 16 and 17 are coupled to the second sprocket mounting portion 62. The sixth sprocket 16 is attached to the bicycle inbound facing side (the third axially facing surface) 66 and the seventh sprocket 17 is attached to the bicycle outbound facing side (the fourth axially facing surface) 68 of the second sprocket supporting member (additional sprocket supporting member) 22. At least one spline 65 extends from the sprocket hub engagement portion 64. Preferably, a plurality of splines 65 are circumferentially disposed about the sprocket hub engagement portion 64. The at least one spline 65 of the sprocket hub engagement portion 64 non-rotatably engages the freewheel of the rear hub such that the second sprocket supporting member 22 rotates with the freewheel of the rear hub.

The first sprocket 11 includes a first sprocket body 70 and a plurality of first sprocket teeth 72 extending radially outwardly from the first sprocket body 70 with respect to the rotational center axis A, as shown in FIG. 7. The first sprocket body 70 has a bicycle inbound facing side 70*a* and a bicycle outbound facing side 70*b*, as shown in FIG. 3. A plurality of fastener openings 74 are disposed in the first sprocket body and extend from the inbound facing side 70*a* to the outbound facing side 70*b*. The first sprocket 11 is a separate member from the first sprocket supporting member 10.

The second sprocket 12 includes a second sprocket body 76 and a plurality of second sprocket teeth 78 extending radially outwardly from the second sprocket body 76 with respect to the rotational center axis A, as shown in FIG. 7. The second sprocket body 76 has a bicycle inbound facing side 76*a* and a bicycle outbound facing side 76*b*, as shown in FIG. 3. A plurality of outer fastener openings 80 are disposed in the second sprocket body and extend from the inbound facing side 76*a* to the outbound facing side 76*b*. A plurality of sprocket engagement portions 82 extend radially inward from the second sprocket body 76, as shown in FIG. 7, An inner fastener opening 84 is disposed in each of the sprocket engagement portions 82. Six sprocket engagement portions 82 are shown in FIG. 7, although any suitable number can be used. The inner fastener openings 84 are disposed radially inward of the outer fastener openings 80. The second sprocket 12 is a separate member from the first sprocket supporting member 10.

The third sprocket 13 includes a third sprocket body 86 and a plurality of third sprocket teeth 88 extending radially outwardly from the third sprocket body 86 with respect to the rotational center axis A, as shown in FIG. 7. The third sprocket body 86 has a bicycle inbound facing side 86*a* and a bicycle outbound facing side 86*b*, as shown in FIG. 3. A plurality of outer fastener openings 90 are disposed in the third sprocket body 86 and extend from the inbound facing side 86*a* to the outbound facing side 86*b*. A plurality of sprocket engagement portions 92 extend radially inward from the third sprocket body 96, as shown in FIG. 7. An inner fastener opening 94 is disposed in each of the sprocket engagement portions 92. Six sprocket engagement portions 92 are shown in FIG. 7, although any suitable number can be used. The inner fastener openings 94 are disposed radially inward of the outer fastener openings 90. The third sprocket 13 is a separate member from the first sprocket supporting member 10.

The fourth sprocket 14 includes a fourth sprocket body 96 and a plurality of fourth sprocket teeth 98 extending radially outwardly from the fourth sprocket body 96 with respect to the rotational center axis A, as shown in FIG. 7. The fourth sprocket body 96 has a bicycle inbound facing side 96*a* and a bicycle outbound facing side 96*b*, as shown in FIG. 3. A plurality of fastener openings 100 are disposed in the fourth sprocket body 96 and extend from the inbound facing side 96*a* to the outbound facing side 96*b*. The fourth sprocket 14 is a separate member from the first sprocket supporting member 10.

The fifth sprocket 15 includes a fifth sprocket body 102. and a plurality of fifth sprocket teeth 104 extending radially outwardly from the fifth sprocket body 102 with respect to the rotational center axis A, as shown in FIG. 6. The fifth sprocket body 102 has a bicycle inbound facing side 102*a* and a bicycle outbound facing side 102*b*, as shown in FIG.

3. A plurality of fastener openings 106 are disposed in the fifth sprocket body 102 and extend from the inbound facing side 102*a* to the outbound facing side 102*b*. The fifth sprocket 15 is a separate member from the second sprocket supporting member 22.

The sixth sprocket 16 includes a sixth sprocket body 108 and a plurality of sixth sprocket teeth 110 extending radially outwardly from the sixth sprocket body 108 with respect to the rotational center axis A, as shown in FIGS. 3 and 6. The sixth sprocket body 108 has a bicycle inbound facing side 108*a* and a bicycle outbound facing side 108*b*, as shown in FIG. 3. A plurality of outer fastener openings 112 are disposed in the sixth sprocket body 108 and extend from the inbound facing side 108*a* to the outbound facing side 108*b*. A plurality of sprocket engagement portions 114 extend radially inward from the second sprocket body 108, as shown in FIG. 6. An inner fastener opening 116 is disposed in each of the sprocket engagement portions 114. Four sprocket engagement portions 114 are shown in FIG. 6, although any suitable number can be used. The inner fastener openings 116 are disposed radially inward of the outer fastener openings 112. The sixth sprocket 16 is a separate member from the second sprocket supporting member 22.

The seventh sprocket 17 includes a seventh sprocket body 118 and a plurality of seventh sprocket teeth 120 extending radially outwardly from the seventh sprocket body 118 with respect to the rotational center axis A, as shown in FIG. 6. The seventh sprocket body 118 has a bicycle inbound facing side 118*a* and a bicycle outbound facing side 118*b*, as shown in FIG. 3. A plurality of outer fastener openings 122 are disposed in the seventh sprocket body and extend from the inbound facing side 118*a* to the outbound facing side 118*b*. A plurality of sprocket engagement portions 124 extend radially inward from the seventh sprocket body 118, as shown in FIG. 6. An inner fastener opening 126 is disposed in each of the sprocket engagement portions 124. Four sprocket engagement portions 124 are shown in FIG. 7, although any suitable number can be used. The inner fastener openings 126 are disposed radially inward of the outer fastener openings 122. The seventh sprocket 17 is a separate member from the second sprocket supporting member 22.

The eighth sprocket 18 includes an eighth sprocket body 128 and a plurality of eighth sprocket teeth 130 extending radially outwardly from the eighth sprocket body 128 with respect to the rotational center axis A, as shown in FIG. 6. The eighth sprocket body 128 has a bicycle inbound facing side 128*a* and a bicycle outbound facing side 128*b*, as shown in FIG. 3. A plurality of fastener openings 132 are disposed in the eighth sprocket body 128 and extend from the inbound facing side 128*a* to the outbound facing side 128*b*. The eighth sprocket 18 is a separate member from the second sprocket supporting member 22.

As best seen in FIG. 1, each of the first to eighth sprockets 11 to 18 has a pitch circle diameter PC1 to PC8, respectively. The pitch circle diameter PC is a diameter of the largest chain ring that corresponds to the location of a longitudinal center of a chain with the rollers fully engaged with the teeth bottoms. Each of the pitch circle diameters is smaller moving from the first sprocket 11 to the eighth sprocket 18. Only portions of the pitch circle diameters PC1 to PC8 are shown in FIG. 1. The first sprocket 11 has a pitch circle with a first diameter PC1. The second sprocket 12 has a second pitch circle with a. second diameter PC2 that is smaller than the first pitch circle diameter PC1. The third sprocket 13 has a third pitch circle with a third diameter PC3 that is smaller than the second pitch circle diameter PC2. The fourth sprocket 14 has a fourth pitch circle with a fourth diameter PC4 that is smaller than the third pitch circle diameter PC3. The fifth sprocket 15 has a fifth pitch circle with a fifth diameter PC5 that is smaller than the fourth pitch circle diameter PC4. The sixth sprocket 16 has a sixth pitch circle with a sixth diameter PC6 that is smaller than the fifth pitch circle diameter PC5. The seventh sprocket 17 has a seventh pitch circle with a seventh diameter PC7 that is smaller than the sixth pitch circle diameter PC6. The eighth sprocket 18 has an eighth pitch circle with an eighth diameter PC8 that is smaller than the seventh pitch circle diameter PC7.

The first sprocket supporting member 10 supports the first sprocket 11, the second sprocket 12, the third sprocket 13 and the fourth sprocket 14, as shown in FIGS. 2 and 3 such that the first to fourth sprockets 11 to 14 rotate with the first sprocket supporting member 10. The first sprocket 11 is attached to the second sprocket 12 by at least one first fastener 134 such that the second sprocket 12 is positioned between the first sprocket 11 and the first sprocket supporting member 10 in an axial direction parallel to the rotational center axis A of the bicycle sprocket assembly 1. The at least one first fastener 134 is received by the fastener openings 74 and 80 in the first and second sprockets 11 and 12. Preferably, a plurality of first fasteners 134 are spaced circumferentially around the rotational center axis A to attach the first sprocket 11 to the second sprocket 12. The first sprocket 11 is adjacent to the second sprocket 12 without another sprocket positioned between the first sprocket 11 and the second sprocket 12 in the axial direction. The at least one first fastener 134 is positioned radially outwardly from the hub engagement portion 56 of the first sprocket supporting member 10 with respect to the rotational center axis A. A spacer 136 is mounted on the first fastener 134 to maintain axial spacing between the first and second sprockets 11 and 12. Alternatively, the spacer 136 can be integrally formed with the first fastener 134 as a single unit. When the spacer 136 is a separate member from the first fastener 134, the spacer 136 is secured to the first fastener 136 in any suitable manner.

The second sprocket 12 is attached to the bicycle inbound facing side (the first axially facing surface) 58 of the first sprocket supporting member 10, as shown in FIGS. 2 and 3. The third sprocket 13 is attached to the bicycle outbound facing side (the second axially facing surface) 60 of the first sprocket supporting member 10. At least one third fastener 138 attaches the second and third sprockets 12 and 13 to the bicycle inbound and outbound facing sides 58 and 60 of the first sprocket supporting member 10. The at least one third fastener 138 is received by the fastener openings 84, 61 and 94 of the second sprocket 12, the first sprocket supporting member 10 and the third sprocket 13. Preferably, a plurality of third fasteners 138 are spaced circumferentially around the rotational center axis A to attach the second sprocket 12 and the third sprocket 13 to the first sprocket supporting member 10. The second sprocket 12 is adjacent the third sprocket 13 without another sprocket positioned between the second sprocket 12 and the third sprocket 13 in the axial direction. The at least one first fastener 134 is positioned radially outwardly from the at least one third fastener 138 with respect to the rotational center axis A. The at least one third fastener 138 is positioned radially outwardly from the hub engagement portion 56 of the first sprocket supporting member 10 with respect to the rotational center axis A. The spacer 42 is positioned radially inwardly from the at least one fifth fastener 150 with respect to the rotational center axis A, as shown in FIGS. 2 and 3.

The fourth sprocket 14 is attached to the third sprocket 13 by at least one second fastener 140 such that the third sprocket 13 is positioned between the fourth sprocket 14 and the first sprocket supporting member 10 in an axial direction parallel to the rotational center axis A of the bicycle sprocket assembly 1. The at least one second fastener 140 is received by the fastener openings 90 and 100 of the third and fourth sprockets 13 and 14. Preferably, a plurality of second fasteners 140 are spaced circumferentially around the rotational center axis A to attach the third sprocket 13 to the fourth sprocket 14. The at least one second fastener 140 is positioned radially outwardly from the third fastener 138 with respect to the rotational center axis A. The third sprocket 13 is adjacent to the fourth sprocket 14 without another sprocket positioned between the third sprocket 13 and the fourth sprocket 14 in the axial direction. The at least one second fastener 140 is positioned radially outwardly from the hub engagement portion 56 of the first sprocket supporting member 10 with respect to the rotational center axis A. The at least one first fastener 134 is positioned radially outwardly from the at least one second fastener 140 with respect to the rotational center axis A. A spacer 142 is mounted on the second fastener 140 to maintain axial spacing between the third and fourth sprockets 13 and 14. Alternatively, the spacer 142 can be integrally formed with the second fastener 140 as a single unit. When the spacer 142 is a separate member from the second fastener 140, the spacer 142 is secured to the second fastener 140 in any suitable manner.

The second sprocket supporting member 22 supports the fifth sprocket 15, the sixth sprocket 16, the seventh sprocket 17 and the eighth sprocket 18, as shown in FIGS. 2 and 3 such that the fifth to eighth sprockets 15 to 18 rotate with the second sprocket supporting member 22. The fifth sprocket 15 is attached to the sixth sprocket 16 by at least one fourth fastener 144 such that the sixth sprocket 16 is positioned between the fifth sprocket 15 and the second sprocket supporting member (the additional sprocket supporting member) 22 in the axial direction parallel to the rotational center axis A of the bicycle rear sprocket assembly 1. The at least one fourth fastener 144 is received by the fastener openings 106 and 112 in the fifth and sixth sprockets 15 and 16. Preferably, a plurality of fourth fasteners 144 are spaced circumferentially around the rotational center axis A to attach the fifth sprocket 15 to the sixth sprocket 16. The fifth sprocket 15 is adjacent to the sixth sprocket 16 without another sprocket positioned between the fifth sprocket 15 and the sixth sprocket 16 in the axial direction. The at least one fourth fastener 144 is positioned radially outwardly from the hub engagement portion 64 of the second sprocket supporting member 22 with respect to the rotational center axis A. A spacer 146 is mounted on the fourth fastener 144 to maintain axial spacing between the fifth and sixth sprockets 15 and 16. Alternatively, the spacer 146 can be integrally formed with the fourth fastener 144 as a single unit. When the spacer 146 is a separate member from the fourth fastener 144, the spacer 146 is secured to the fourth fastener 146 in any suitable manner.

The sixth sprocket 16 is attached to the bicycle inbound facing side (the third axially facing surface) 66 of the second sprocket supporting member (the additional sprocket supporting member) 22, as shown in FIGS. 2 and 3. The seventh sprocket 17 is attached to the bicycle outbound facing side (the fourth axially facing surface) 68 of the second sprocket supporting member (the additional sprocket supporting member) 22. At least one sixth fastener 148 attaches the sixth and seventh sprockets 16 and 17 to the bicycle inbound and outbound facing sides 66 and 68 of the second sprocket supporting member 22 (additional sprocket supporting member). The at least one sixth fastener 148 is received by the fastener openings 116, 67 and 122 in the sixth sprocket 16, the second sprocket supporting member 22 and the seventh sprocket 17. Preferably, a plurality of sixth fasteners 148 are spaced circumferentially around the rotational center axis A to attach the sixth sprocket 16 and the seventh sprocket 17 to the second sprocket supporting member 22. The sixth sprocket 16 is adjacent the seventh sprocket 17 without another sprocket positioned between the sixth sprocket 16 and the seventh sprocket 17 in the axial direction. The fourth fastener 144 is positioned radially outwardly from the sixth fastener 148 with respect to the rotational center axis A. The sixth fastener 148 is positioned radially outwardly from the hub engagement portion 64 of the second sprocket supporting member 22 with respect to the rotational center axis A. The spacer 42 is positioned radially inwardly from the at least one sixth fastener 148 with respect to the rotational center axis A, as shown in FIGS. 2 and 3.

The eighth sprocket 18 is attached to the seventh sprocket 17 by at least one fifth fastener 150 such that the seventh sprocket 17 is positioned between the eighth sprocket 18 and the second sprocket supporting member (the additional sprocket supporting member) 22 in the axial direction parallel to the rotational center axis A of the bicycle rear sprocket assembly 1. The at least one fifth fastener 150 is received by the fastener openings 122 and 132 in the seventh and eighth sprockets 17 and 18. Preferably, a plurality of fifth fasteners 150 are spaced circumferentially around the rotational center axis A to attach the seventh sprocket 17 to the eighth sprocket 18. The at least one fifth fastener 150 is positioned radially outwardly from the at least one sixth fastener 148 with respect to the rotational center axis A. The at least one fifth fastener 150 is positioned radially outwardly from the sixth fastener 148 with respect to the rotational center axis A. The seventh sprocket 17 is adjacent to the eighth sprocket 18 without another sprocket positioned between the fourth sprocket 17 and the eighth sprocket 18 in the axial direction. The at least one sixth fastener 1 is positioned radially outwardly from the hub engagement portion 64 of the second sprocket supporting member 22 with respect to the rotational center axis A. The at least one sixth fastener 150 is positioned radially inwardly from the at least one third fastener 138 with respect to the rotational center axis A, as shown in FIGS. 2 and 3. A spacer 152 is mounted on the fifth fastener 150 to maintain axial spacing between the seventh and eighth sprockets 17 and 18. Alternatively, the spacer 152 can be integrally formed with the fifth fastener 150 as a single unit. When the spacer 152 is a separate member from the fifth fastener 150, the spacer 152 is secured to the fifth fastener 150 in any suitable manner.

The first and second sprocket supporting members 10 and 22 and the spacers 36, 42 and 58 are secured together by a fastener 154, as shown in FIGS. 2 to 5. The fastener 154 is received by fastener openings 156 and 158 in the first and second sprocket supporting members 10 and 22. Preferably, a plurality of fastener openings 156 and 158 are spaced circumferentially around the rotational center axis A. The fastener 154 is received by fastener openings 40, 46 and 52 in the spacers 36, 42 and 48. As shown in FIG. 5, three fasteners 154 are used, although any suitable number of fasteners can be used.

The exemplary embodiment of the present invention shown in FIGS. 1 to 7 provides the bicycle sprocket assembly 1 in which the first sprocket supporting member 10 supports first, second, third and fourth sprockets 11-14, as shown in FIGS. 1 to 7, such that the first to fourth sprockets 11-14 are free from directly contacting the freewheel of the rear hub. The second sprocket supporting member 22 supports fifth, sixth, seventh and eighth sprockets 15-18, as shown in FIGS. 1 to 7, such that the fifth to eighth sprockets 15-18 are free from directly contacting the freewheel of the rear hub. Accordingly, the surface area of the first to eighth sprockets 11-18 can be lessened, thereby reducing the weight of the bicycle sprocket assembly 1. Further, the number of sprocket supporting members supporting the sprockets is lessened, thereby further reducing the weight of the bicycle sprocket assembly 1.

Figure 8:
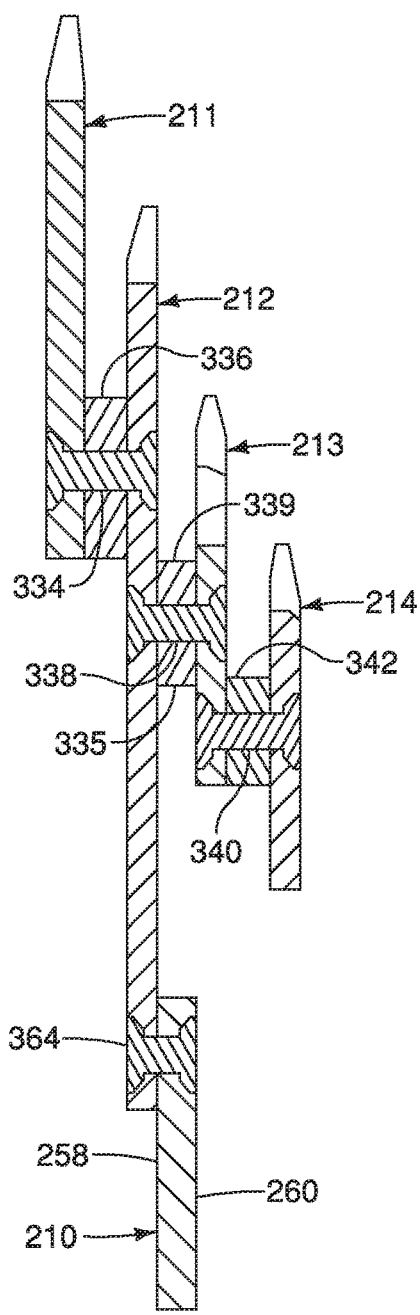
FIG. 8 is a cross sectional view, similar to FIG. 3, of an alternative multiple (ten-stage) bicycle sprocket assembly in accordance with another illustrated embodiment.

As shown in FIG. 8, a multiple bicycle sprocket assembly in accordance with a second exemplary embodiment of the present invention is substantially similar to the multiple bicycle sprocket assembly 1 of the first exemplary embodiment except for the differences described below. Similar parts are identified with similar reference numerals, except increased by 200 (i.e., 2xx or 3xx, accordingly).

The first to fourth sprockets 211-214 are supported by a sprocket supporting member 210. The sprocket supporting member 210 has a first bicycle inbound facing side (i.e., a first axially facing surface) 258 and a first bicycle outbound facing side (i.e., a second axially facing surface) 260 facing in an opposite direction with respect to the first bicycle inbound facing side 258 in an axial direction parallel to the rotational center axis A of the multiple bicycle sprocket assembly. At least one of the second sprocket 212 and the third sprocket 213 is attached to the sprocket supporting member 210. As shown in FIG. 8, the second sprocket 212. is attached to the bicycle inbound facing side (first axially facing surface) 258 with at least one third fastener 364. A sprocket is not directly attached to the bicycle outbound facing side (second axially facing surface) 260 of the sprocket supporting member 210 in the exemplary embodiment shown in FIG. 8.

The first sprocket 211 is attached to the second sprocket 212. by at least one first fastener 334 such that the second sprocket 212 is positioned between the first sprocket 211 and the third sprocket 213 in an axial direction parallel to the rotational center axis A of the bicycle sprocket assembly. The first sprocket 211 is adjacent to the second sprocket 212 without another sprocket positioned between the first sprocket 211 and the second sprocket 212 in the axial direction. A spacer 336 is mounted on the first fastener 334 to maintain axial spacing between the first and second sprockets 211 and 212. Alternatively, the spacer 336 can be integrally formed with the first fastener 334 as a single unit. When the spacer 336 is a separate member from the first fastener 334, the spacer 336 is secured to the first fastener 334 in any suitable manner.

The second sprocket 212 is attached to the third sprocket 213 by at least one additional fastener 338 such that the second sprocket 212. is positioned between the first sprocket 211 and the third sprocket 213 in an axial direction parallel to the rotational center axis A of the bicycle sprocket assembly. The second sprocket 212 is adjacent to the third sprocket 213 without another sprocket positioned between the second sprocket 212 and the third sprocket 213 in the axial direction. A spacer 339 is mounted on the additional fastener 338 to maintain axial spacing between the second and third sprockets 212 and 213. Alternatively, the spacer 339 can be integrally formed with the additional fastener 338 as a single unit. When the spacer 339 is a separate member from the additional fastener 338, the spacer 339 is secured to the additional fastener 338 in any suitable manner.

The third sprocket 213 is attached to the fourth sprocket 214 by at least one second fastener 340 such that the third sprocket 213 is positioned between the second sprocket 212 and the fourth sprocket 214 in an axial direction parallel to the rotational center axis A of the bicycle sprocket assembly. The third sprocket 213 is adjacent to the fourth sprocket 214 without another sprocket positioned between the third sprocket 213 and the fourth sprocket 214 in the axial direction. A spacer 342 is mounted on the second fastener 340 to maintain axial spacing between the third and fourth sprockets 213 and 214. Alternatively, the spacer 342 can be integrally formed with the second fastener 340 as a single unit, When the spacer 342 is a separate member from the second fastener 340, the spacer 342. is secured to the second fastener 340 in any suitable manner. The first, second and additional fasteners 334, 340 and 338 are disposed radially outwardly from the third fastener 364 attaching the second sprocket 212 to the sprocket supporting member 210 with respect to the rotational center axis A.

The fifth to eighth sprockets can be similarly configured as the first to fourth sprockets 211 to 214, as shown in FIG. 8. Accordingly, the fifth to eighth sprockets are attached to another sprocket supporting member in a similar manner as the first to fourth sprockets 211 to 214 are attached to the sprocket supporting member 210. The remaining sprockets and spacers are similarly configured as in the exemplary embodiment shown in FIGS. 1 to 7.

Figure 9:
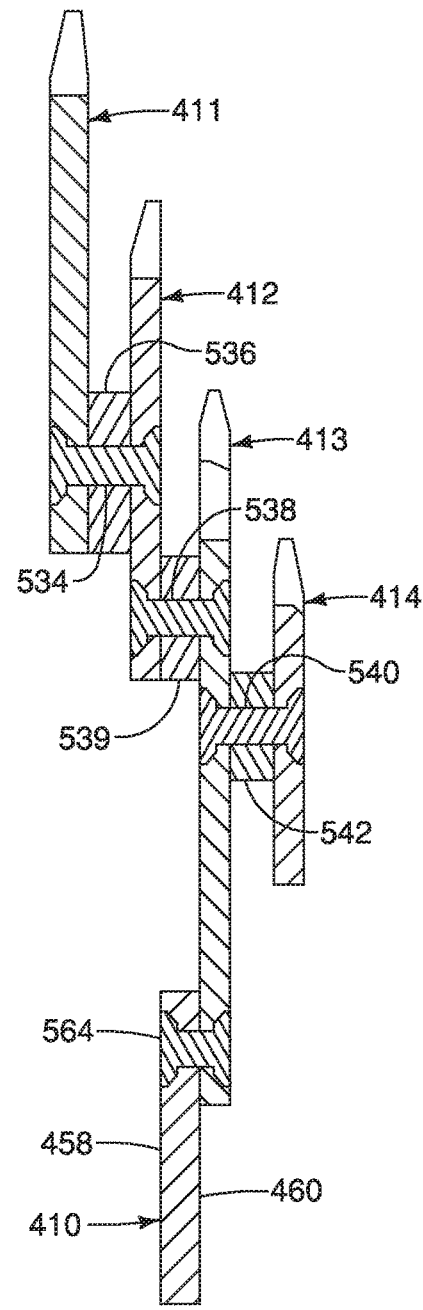
FIG. 9 is a cross sectional view, similar to FIG. 3, of another alternative multiple (ten-stage) bicycle sprocket assembly in accordance with another illustrated embodiment.

As shown in FIG. 9, a multiple bicycle sprocket assembly in accordance with a second exemplary embodiment of the present invention is substantially similar to the multiple bicycle sprocket assembly of the second exemplary embodiment except for the differences described below. Similar parts are identified with similar reference numerals, except increased by 200 (i.e., 4xx or 5xx, accordingly).

The first to fourth sprockets 411-414 are supported by a sprocket supporting member 410. The sprocket supporting member 410 has a first bicycle inbound facing side (i.e., a first axially facing surface) 458 and a first bicycle outbound facing side (i.e., a second axially facing surface) 460 facing in an opposite direction with respect to the first bicycle inbound facing side 458 in an axial direction parallel to the rotational center axis A of the multiple bicycle sprocket assembly. At least one of the second sprocket 412 and the third sprocket 413 is attached to the sprocket supporting member 410. As shown in FIG. 9, the third sprocket 413 is attached to the bicycle outbound facing side (second axially facing surface) 460 with at least one third fastener 564. A sprocket is not directly attached to the bicycle inbound facing side (first axially facing surface) 458 of the sprocket supporting member 410 in the exemplary embodiment shown in FIG. 9.

The first sprocket 411 is attached to the second sprocket 412 by at least one first fastener 534 such that the second sprocket 412 is positioned between the first sprocket 411 and the third sprocket 413 in an axial direction parallel to the rotational center axis A of the bicycle sprocket assembly. The first sprocket 411 is adjacent to the second sprocket 412 without another sprocket positioned between the first sprocket 411 and the second sprocket 412 in the axial direction. A spacer 536 is mounted on the first fastener 534 to maintain axial spacing between the first and second sprockets 411 and 412. Alternatively, the spacer 536 can be integrally formed with the first fastener 534 as a single unit. When the spacer 536 is a separate member from the first fastener 534, the spacer 536 is secured to the first fastener 534 in any suitable manner.

The second sprocket 412 is attached to the third sprocket 413 by at least one additional fastener 538 such that the second sprocket 412 is positioned between the first sprocket 411 and the third sprocket 413 in an axial direction parallel to the rotational center axis A of the bicycle sprocket assembly. The second sprocket 412 is adjacent to the third sprocket 413 without another sprocket positioned between the second sprocket 412 and the third sprocket 413 in the axial direction. A spacer 539 is mounted on the additional fastener 538 to maintain axial spacing between the second and third sprockets 412 and 413. Alternatively, the spacer 539 can be integrally formed with the additional fastener 538 as a single unit. When the spacer 539 is a separate member from the additional fastener 538, the spacer 539 is secured to the additional fastener 538 in any suitable manner.

The third sprocket 413 is attached to the fourth sprocket 414 by at least one second fastener 540 such that the third sprocket 413 is positioned between the second sprocket 412 and the fourth sprocket 414 in an axial direction parallel to the rotational center axis A of the bicycle sprocket assembly. The third sprocket 413 is adjacent to the fourth sprocket 414 without another sprocket positioned between the third sprocket 413 and the fourth sprocket 414 in the axial direction. A spacer 542 is mounted on the second fastener 540 to maintain axial spacing between the third and fourth sprockets 413 and 414. Alternatively, the spacer 542 can be integrally formed with the second fastener 540 as a single unit. When the spacer 542 is a separate member from the second fastener 540, the spacer 542 is secured to the second fastener 540 in any suitable manner. The first, second and additional fasteners 534, 540 and 538 are disposed radially outwardly from the third fastener 564 attaching the third sprocket 513 to the sprocket supporting member 410 with respect to the rotational center axis A.

The fifth to eighth sprockets can be similarly configured as the first to fourth sprockets 411 to 414, as shown in FIG. 9. Accordingly, the fifth to eighth sprockets are attached to another sprocket supporting member in a similar manner as the first to fourth sprockets 411 to 414 are attached to the sprocket supporting member 410. The remaining sprockets and spacers are similarly configured as in the exemplary embodiment shown in FIGS. 1 to 7.

Although shown in FIGS. 1 to 9 as a rear sprocket assembly, the multiple bicycle sprocket assembly in accordance with the exemplary embodiments of the present invention is equally applicable to a front sprocket assembly.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle sprocket assembly. Accordingly, these directional terms, as utilized to describe the bicycle sprocket assembly should be interpreted relative to a bicycle in an upright riding position on a horizontal surface and that is equipped with the multiple bicycle sprocket assembly. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components and these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features). Thus, the foregoing descriptions of the embodiments according to the present invention are provided for illustration only, and not for the purpose of limiting the invention as defined by the appended claims and their equivalents.

What is claimed is:

1. A bicycle sprocket assembly comprising:
   a first sprocket having a first pitch circle with a first diameter;
   a second sprocket having a second pitch circle with a second diameter that is smaller than the first diameter;
   a third sprocket having a third pitch circle with a third diameter that is smaller than the second diameter;
   a fourth sprocket having a fourth pitch circle with a fourth diameter that is smaller than the third diameter; and a sprocket supporting member having a hub engagement portion, at least one of the second sprocket and the third sprocket being attached to the sprocket supporting member, the first sprocket being attached to the second sprocket by at least one first fastener so that the second sprocket is positioned between the first sprocket and the sprocket supporting member in an axial direction parallel to a rotational center axis of the bicycle sprocket assembly, the fourth sprocket being attached to the third sprocket by at least one second fastener so that the third sprocket is positioned between the sprocket supporting member and the fourth sprocket in the axial direction, the at least one first fastener being positioned radially outwardly from the at least one second fastener with respect to the rotational center axis, and the second sprocket being adjacent to the third sprocket without another sprocket positioned between the second sprocket and the third sprocket in the axial direction.

2. The bicycle sprocket assembly according to claim 1, wherein the sprocket supporting member has a first axially facing surface and a second axially facing surface non-facing with respect to the first axially facing surface in the axial direction.

3. The bicycle sprocket assembly according to claim 2, wherein the second sprocket is attached to the first axially facing surface of the sprocket supporting member.

4. The bicycle sprocket assembly according to claim 2, wherein the third sprocket is attached to the second axially facing surface of the sprocket supporting member.

5. The bicycle sprocket assembly according to claim 1, wherein the second sprocket and the third sprocket are attached to the sprocket supporting member by at least one third fastener.

6. The bicycle sprocket assembly according to claim 1, wherein the first sprocket is adjacent to the second sprocket without another sprocket positioned between the first sprocket and the second sprocket in the axial direction.

7. The bicycle sprocket assembly according to claim 1, wherein the third sprocket is adjacent to the fourth sprocket without another sprocket positioned between the third sprocket and the fourth sprocket in the axial direction.

8. The bicycle sprocket assembly according to claim 5, wherein the at least one third fastener is positioned radially outwardly from the huh engagement portion of the sprocket supporting member with respect to the rotational center axis.

9. The bicycle sprocket assembly according to claim 8, wherein the at least one first fastener is positioned radially outwardly from the at least one third fastener with respect to the rotational center axis.

10. A The bicycle sprocket assembly comprising:

a first sprocket having a first pitch circle with a first diameter;

a second sprocket having a second pitch circle with a second diameter that is smaller than the first diameter;

a third sprocket having a third pitch circle with a third diameter that is smaller than the second diameter;

a fourth sprocket having a fourth pitch circle with a fourth diameter that is smaller than the third diameter; and a sprocket supporting member having a hub engagement portion at least one of the second sprocket and the third sprocket being attached to the sprocket supporting member, the first sprocket being attached to the second sprocket by at least one first fastener so that the second sprocket is positioned between the first sprocket and the sprocket supporting member in an axial direction parallel to a rotational center axis of the bicycle sprocket assembly, the fourth sprocket being attached to the third sprocket by at least one second fastener so that the third sprocket is positioned between the sprocket supporting member and the fourth sprocket in the axial direction, the second sprocket being adjacent to the third sprocket without another sprocket positioned between the second sprocket and the third sprocket in the axial direction, the second sprocket and the third sprocket being attached to the sprocket supporting member by at least one third fastener, the at least one third fastener being positioned radially outwardly from the hub engagement portion of the sprocket supporting member with respect to the rotational center axis, and the at least one second fastener being positioned radially outwardly from the at least one third fastener with respect to the rotational center axis.

11. A The bicycle sprocket assembly comprising:

a first sprocket having a first pitch circle with a first diameter;

a second sprocket having a second pitch circle with a second diameter that is smaller than the first diameter;

a third sprocket having a third pitch circle with a third diameter that is smaller than the second diameter;

a fourth sprocket having a fourth pitch circle with a fourth diameter that is smaller than the third diameter;

a sprocket supporting member having a hub engagement portion;

a fifth sprocket having a fifth pitch circle with a fifth diameter that is smaller than the fourth diameter;

a sixth sprocket having a sixth pitch circle with a sixth diameter that is smaller than the fifth diameter;

a seventh sprocket having a seventh pitch circle with a seventh diameter that is smaller than the sixth diameter;

an eighth sprocket having an eighth pitch circle with a eighth diameter that is smaller than the seventh diameter; and an additional sprocket supporting member having an additional hub engagement portion, at least one of the second sprocket and the third sprocket being attached to the sprocket supporting member, the first sprocket being attached to the second sprocket by at least one first fastener so that the second sprocket is positioned between the first sprocket and the sprocket supporting member in an axial direction parallel to a rotational center axis of the bicycle sprocket assembly, the fourth sprocket being attached to the third sprocket by at least one second fastener so that the third sprocket is positioned between the sprocket supporting member and the fourth sprocket in the axial direction, the second sprocket being adjacent to the third sprocket without another sprocket positioned between the second sprocket and the third sprocket in the axial direction.

at least one of the sixth sprocket and the seventh sprocket being attached to the additional sprocket supporting member, the fifth sprocket being attached to the sixth sprocket by at least one fourth fastener so that the sixth sprocket is positioned between the fifth sprocket and the additional sprocket supporting member in the axial direction, the eighth sprocket being attached to the seventh sprocket by at least one fifth fastener so that the seventh sprocket is positioned between the additional sprocket supporting member and the eighth sprocket in the axial direction, and the sixth sprocket being adjacent to the seventh sprocket without another sprocket positioned between the sixth sprocket and the seventh sprocket in the axial direction.

12. The bicycle sprocket assembly according to claim 11, further comprising
a spacer positioned between the sprocket supporting member and the additional sprocket supporting member in the axial direction.

13. The bicycle sprocket assembly according to claim 12, wherein
the spacer is positioned radially inwardly from the at least one fifth fastener with respect to the rotational center axis.

14. The bicycle sprocket assembly according to claim 11, wherein
the sixth sprocket and the seventh sprocket are attached to the additional sprocket supporting member by at least one sixth fastener.

15. The bicycle sprocket assembly according to claim 12, wherein
the sixth sprocket and the seventh sprocket are attached to the additional sprocket supporting member by at least one sixth fastener, the spacer being positioned radially inwardly from the at least one sixth fastener with respect to the rotational center axis.

16. The bicycle sprocket assembly according to claim 14, wherein
the second sprocket and the third sprocket are attached to the sprocket supporting member by at least one third fastener, the at least one sixth fastener being positioned radially inwardly from the at least one third fastener with respect to the rotational center axis.

17. The bicycle sprocket assembly according to claim 11, wherein
the additional sprocket supporting member has a third axially facing surface and a fourth axially facing surface non-facing with respect to the third axially facing surface in an axial direction parallel to a rotational center axis of the bicycle sprocket assembly.

18. The bicycle sprocket assembly according to claim 17, wherein
the sixth sprocket is attached to the third axially facing surface of the additional sprocket supporting member.

19. The bicycle sprocket assembly according to claim 17, wherein
the seventh sprocket is attached to the fourth axially facing surface of the additional sprocket supporting member.

* * * * *